United States Patent [19]
Marusue et al.

[11] Patent Number: 5,839,988
[45] Date of Patent: Nov. 24, 1998

[54] CONTROL SYSTEM OF AUTOMATIC TRANSMISSION

[75] Inventors: Toshihisa Marusue, Hiroshima; Takuji Fujiwara; Kazunori Enokido, both of Hiroshima-ken; Tatsutoshi Mizobe, Hiroshima; Hiroaki Yokota, Higashi-Hiroshima; Shinya Kamada, Hiroshima, all of Japan

[73] Assignee: Mazda Motor Corporation, Hiroshima-ken, Japan

[21] Appl. No.: 248,895

[22] Filed: May 25, 1994

Related U.S. Application Data

[63] Continuation-in-part of Ser. No. 213,790, Mar. 16, 1994.

[30] Foreign Application Priority Data

May 31, 1993 [JP] Japan .................................. 5-154203

[51] Int. Cl.$^6$ .................................................. F16H 61/04
[52] U.S. Cl. .......................... 477/130; 477/155; 477/156; 477/176
[58] Field of Search ................................... 477/127, 130, 477/131, 143, 149, 155, 156, 168, 176

[56] References Cited

U.S. PATENT DOCUMENTS 5,014,575  5/1991  Fujiwara et al. ..................... 477/155 X
5,361,651  11/1994  Wakahara ................................ 477/130

FOREIGN PATENT DOCUMENTS 61-45157  3/1986  Japan .
5829420   6/1986  Japan .
1150055   6/1989  Japan .
4140569   5/1992  Japan .

Primary Examiner—Khoi Q. Ta
Attorney, Agent, or Firm—Keck, Mahin & Care

[57] ABSTRACT

A control system of an automatic transmission includes a torque converter, a lock-up clutch for directly connecting input and output members of the torque converter, a pressure control valve which changes a hydraulic pressure to control an engaging force of the lock-up clutch, and a pressure regulator, disposed in an engaging passage, which supplies hydraulic pressure to engage a frictional element. The pressure regulator adjusts a primary pressure and produces an output hydraulic pressure corresponding to a control pressure introduced into a control port of the pressure regulator. A control pressure supply device is provided for introducing the control pressure, controlled by the pressure control valve, into the control port of the pressure regulator. The number of parts can be reduced without producing any inconvenience.

20 Claims, 7 Drawing Sheets

CONTROL SYSTEM OF AUTOMATIC TRANSMISSION

CROSS REFERENCE TO THE RELATED APPLICATIONS

The present application is a continuation-in-part of U.S. patent application Ser. No. 08/213,790, filed on Mar. 16, 1994, entitled "SHIFT CONTROL SYSTEM OF AUTOMATIC TRANSMISSION" which is assigned by the same assignee as the present application.

BACKGROUND OF THE INVENTION

1. Field of the Invention

The present invention relates to a control system of an automatic transmission and, in particular, to a control system of the type having a torque converter, a lock-up clutch for transmitting an engine output to a shift gear mechanism and an adjusting valve disposed in an engaging passage of a frictional element for controlling an engaging pressure of the element.

2. Description of Related Art

In an automatic transmission where a torque converter is combined with a shift gear mechanism so as to selectively operate frictional elements, such as clutch of the shift gear mechanism to switch a power transmitting passage of the shift gear mechanism and thus to switch a shift stage automatically in accordance with a vehicle driving condition, it has been known that in order to reduce an energy loss through the torque converter and to improve a fuel consumption efficiency, a lock-up clutch is provided for directly connecting input and output members of the torque converter under a predetermined driving condition where there is no need to amplify the engine torque transmitted therethrough and the like. In this case, as disclosed in Japanese Patent Public Disclosure No. 4-140569, laid open to the public in 1992, there is provided a pressure regulator for adjusting a pressure difference between an engaging chamber introducing engaging pressure of the lock-up clutch and a releasing chamber introducing a releasing pressure thereof. The control pressure of the pressure regulator is changed in accordance with a pressure control valve such as a solenoid valve so that a half engaged condition or slip condition of the lock-up clutch can be controllably established.

Meanwhile, it has also been known that the engaging pressure for the frictional elements is controlled by the pressure regulator. For example, in Japanese patent Public Disclosure No. 1-150055, laid open to the public in 1989, it is disclosed that a pressure regulator is disposed in a hydraulic passage for engaging a frictional element and that a control pressure introduced to the pressure regulator is controlled by a pressure control solenoid valve. According to the disclosure in the Japanese Patent Public Disclosure No. 1-150055, it is possible to widely control the engaging pressure to the frictional element. As a result, this structure enables an engaging and releasing action of the frictional element to be made smoothly to thereby reduce a shift shock. In addition, after the shift operation, the capacity of the torque transmitting of the frictional element is adapted to the input torque thereto so that a driving loss of oil pump can be reduced and the engine torque can be transmitted safely.

It should, however, be noted that if such a pressure control valve which solely serves for the pressure control of each of the frictional element is employed to control the control pressure for the pressure regulator as disclosed in the above Japanese publication, the number of parts is undesirably increased.

SUMMARY OF THE INVENTION

It is therefore an object of the present invention to properly control an engaging pressure of a frictional element utilizing a pressure control solenoid valve for a lock-up clutch of an automatic transmission.

It is another object of the present invention to control the engaging pressure of a frictional element by means of a pressure regulator without providing a pressure control solenoid valve which solely serves for the pressure control of the frictional element.

It is a further object of the present invention to properly control an engaging pressure of a frictional element without increasing the number of parts.

The above and other objects of the invention can be accomplished by a control system of an automatic transmission comprising a torque converter, a lock-up clutch for directly connecting input and output members of the torque converter, a pressure control solenoid valve which controls an engaging pressure of the lock-up clutch, a pressure regulator disposed in an engaging passage of a frictional element for adjusting a primary pressure to produce an output hydraulic pressure regulated in accordance with a control pressure introduced into a control port of the pressure regulator and a control pressure supply device for introducing a hydraulic pressure controlled by the pressure control solenoid valve into the control port.

In another aspect of the invention, a control device for an automatic transmission further comprises a switching valve to which the hydraulic pressure controlled by the pressure control valve is introduced as a control pressure. The switching valve is actuated to introduce an interrupt pressure to an interrupt port of the pressure regulator so as to prevent the pressure regulator from reducing the output pressure in the course of the pressure regulating action when the control pressure introduced to the control port is greater than a predetermined value.

In a further aspect of the invention, a control system of an automatic transmission further comprises a pressure control interrupt device for preventing the pressure regulator from reducing the output pressure in the course of the pressure control action when an engaging force of the lock-up clutch is controllable.

According to the present invention, a hydraulic pressure controlled by the pressure control solenoid valve which controls the engaging force of the lock-up clutch of the torque converter is introduced to the control port of the pressure regulator disposed on an engaging pressure introduction passage for a frictional element. As a result, the engaging pressure introduced to the frictional element during a shift operation can be effectively controlled by means of the pressure regulator without employing a pressure control solenoid valve which solely serves for the control of the engaging pressure of the frictional element. Accordingly, it is possible to effectively control both the engaging force of the lock-up clutch and the engaging force of the frictional element during the shift operation.

In particular, according to the above one aspect of the invention, there is provided a switching valve to which a hydraulic pressure adjusted by the pressure control solenoid valve is introduced. The switching valve supplies an interrupt pressure to an interrupt port for preventing the pressure regulator from reducing output pressure thereof during the pressure adjusting action of the frictional element. As a result, the control range of the engaging pressure of the frictional element can be reduced so that a sophisticated control of the engaging pressure can be accomplished during a shift operation due to the change of the driving condition. In addition, after the shift operation, the frictional element is kept engaged reliably.

In another aspect of the present invention, a pressure control interrupt device which prevents the pressure regulator from controlling, for example, reducing the output pressure through the engaging force control action in the case where the engaging force of the lock-up clutch is controllable, the frictional element is kept engaged reliably even if the lock-up clutch is actuated to make a slip control with the frictional element being engaged.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

Figure 1:
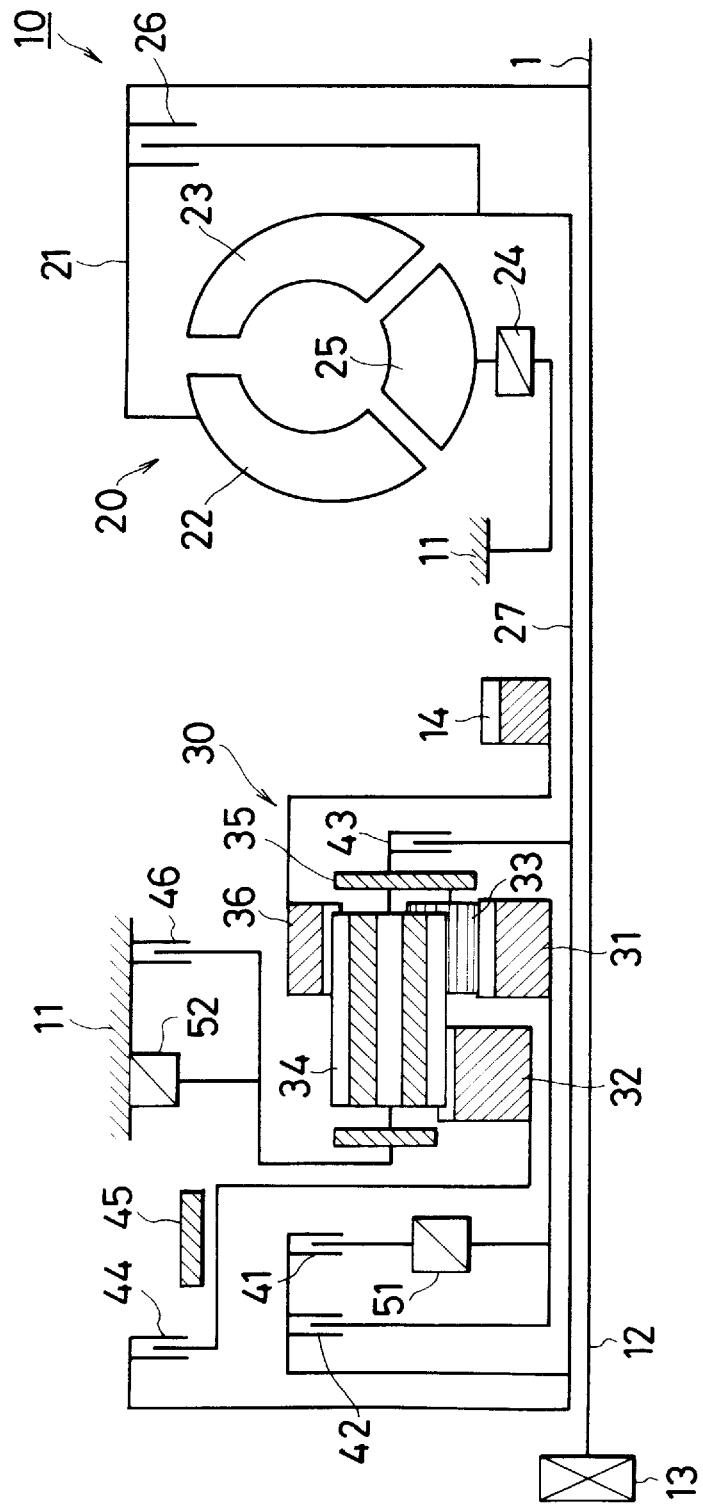
FIG. 1 is a schematic view of an automatic transmission used with a shift control system in accordance with a preferred embodiment of the present invention.

Referring to FIG. 1, an automatic transmission 10 according to the present invention includes a torque converter 20, a transmission gear mechanism 30 driven by an output of the torque converter 20, a plurality of frictional elements 41–46, such as clutches and brakes for switching a power transmitting path of the transmission gear mechanism 30 and one way clutches 51 and 52 among running ranges D, S, L and R and shift stages 1–4 in the D range, 1–3 in the S range and 1 and 2 in the L range.

The torque converter 20 is provided with a pump 22 integral with a transmission case 21 connected with an output 20 shaft 1 of an engine, a turbine 23 disposed facing the pump 22 and driven thereby through a hydraulic fluid, a stator 25 disposed between the pump 22 and turbine 23 and carried by the converter case 21 through a one way clutch 24 and a lock-up clutch 17 for directly connecting the output shaft 16 with the engine output shaft 2 through the converter case 11. A rotation of the turbine 23 is transmitted to the transmission gear mechanism 30 through a turbine shaft 27. To the engine output shaft 1 is connected a pump shaft 12, which passes through the turbine shaft 27, drives an oil pump 13 which is disposed at a rear end portion of the transmission gear mechanism 30.

The transmission gear mechanism 30 is constituted by Ravigneaux-type planetary gear mechanism and provided with a a small sun gear 31 arranged over the turbine shaft 27, a large sun gear 32 arranged over the turbine shaft 27 rearward of the small sun gear 31, a plurality of short pinion gears 33 meshed with the small sun gear 31, long pinion gear 34 of which rear portion is meshed with the large sun gear 32, a carrier 35 rotatably supporting the long pinion gear 34 and the short pinion gear 33 and a ring gear 36 meshed with the long pinion gear 34.

Between the turbine shaft 27 and small sun gear 31 are disposed a forward clutch 41 and a first one way clutch 51 in tandem. A coast clutch 42 is juxtaposed with the clutch 41 and 51. A 3-4 clutch 43 is disposed between the turbine shaft 27 and the carrier 35. A reverse clutch 44 is disposed between the turbine shaft 27 and the large sun gear 32. Between the large sun gear 32 and the reverse clutch 44 is disposed a 2-4 brake 45 of a band brake for fixing the large sun gear 32. A second one way clutch 52 receives a reaction force of the carrier 35 and a low-reverse brake 46 fixes the carrier 35. The ring gear 36 is connected with the output gear 14 through which the rotation is transmitted to right and left wheels (not shown).

Explaining a relationship between the operations of the clutches 51 and 52 and the shift stages, in the first stage, the forward clutch 41 is engaged and the first and second one way clutches 51 and 52 are locked. As a result, the output rotation of the torque converter 20 is transmitted to the small sun gear 31 of the transmission gear mechanism through the turbine shaft 27, forward clutch 41 and one way clutch 51. In this case, the carrier 35 is fixed by means of the second one way clutch 52 so that the transmission gear mechanism 30 operates as a fixed gear train which transmits the rotation from the small sun gear 31 to the ring gear through the short pinion gear 33 and long pinion gear 34 without making a differential action. As a result, the first stage of a large reduction ratio corresponding to a diameter ratio between the small sun gear 31 and the ring gear 36 is obtained.

In a second stage, the 2-4 brake 45 is further engaged in addition to the condition of the first stage. The large sun gear 32 is fixed and the second one way clutch 52 is brought to a racing condition. As a result, the rotation of the turbine shaft 27 is transmitted to the small sun gear 31 and then to the long pinion gear 34 through the short pinion gear 33. In this case, since the large sun gear 32 is fixed, the long pinion gear 34 moves around the large sun gear 32 and thus the carrier 35 is rotated. As a result, the rotation speed of the ring gear 36 is increased by the rotation of the carrier 35 (revolution speed of the long pinion gear 34) compared with the first stage. Thus, the second stage of a smaller reduction ratio than the first stage is obtained. In this case, the 2-4 brake 45 is operated to apply the braking force against normal rotation or rotation for a forward movement.

In a third stage, the 2-4 brake is released in the second stage and the 3-4 clutch 43 is engaged. As a result, the rotation of the turbine shaft 27 is transmitted to the small sun gear 31 through the forward clutch 41 and first one way clutch 51 as well as to the carrier 35 through the 3-4 clutch 43. Thus, the transmission mechanism 30 is integrally rotated so that the third stage is obtained in which the ring gear 36 is rotated at the same speed as the turbine shaft 27.

In a fourth stage, the 2-4 brake which is once released in the third stage is engaged again. Therefore, the rotation of the turbine shaft 27 is transmitted to the carrier 35 of the transmission gear mechanism 30 through the 3-4 clutch 43 so that the long pinion gear 34 moves around the sun gear 32. In this case, since the large sun gear 32 meshed with the long pinion gear 34 is fixed by means of the 2-4 brake 45, the long pinion gear 34 moves around the sun gear 32 together with the carrier 35 and revolves on it own axis. As a result, the rotation of the ring gear 36 meshed with the long pinion gear 34 is increased by the rotation of the carrier 35 (the rotation of the turbine shaft 27) and the rotation of the long pinion gear 34 on its own axis so that the fourth stage of an over drive can be obtained. In this case, the forward clutch is engaged. It should be noted that the one way clutch 51 in tandem with the forward clutch 41 is raced so that there is no fear that the rotation of the turbine shaft 27 is introduced to the small sun gear 31.

In a rearward stage, the reverse clutch 44 and the low-reverse brake 46 are engaged. Thus, the rotation of the turbine shaft 27 is introduced to the large sun gear 32 and the carrier 35 of the transmission gear mechanism 30 is fixed. Therefore, the rotation of the turbine shaft 27 is transmitted to the ring gear 36 through a fixed gear train including the large sun gear 32 and long pinion gear 34. A reduction ratio corresponding to the diameter of large sun gear 34 and ring gear 36 can be obtained. In this case, the rotating direction of the ring gear 36 is opposite to that of the turbine shaft 27 or the large sun gear 32.

The first one way clutch 51 transmitting the rotation in the first to third stage and the second one way clutch 52 bearing a reaction force in the first stage are raced in a coasting condition. Therefore, in the above shift stages, the engine brake is not enacted. However, in the third stage in D range, second and third stages of S range and first and second stages of L range, the coast clutch 42 in parallel with the first one way clutch 51 is engaged and in the first stage of L range, low-reverse brake 46 in parallel with the second one way clutch 52 is engaged to provide the engine brake.

Table 1 shows operations of the respective frictional elements 41–46 such as clutches and brakes and one way clutches 51 and 52.

and 46 are constituted by conventional hydraulic pistons respectively to engage the frictional elements 41–44 and 46.

The hydraulic control circuit 60 includes a regulator valve 61 for adjusting a hydraulic pressure delivered to a main line 110 from the oil pump 13 of FIG. 1 to a predetermined line pressure, a manual valve 62 for selecting a range by a manual operation, a first, second and third shift valve 63, 64 and 65 for controlling the hydraulic pressure of the actuators of the frictional elements 41–46.

The manual valve 62 is able to select one of D, S, L ranges for forward movement, R range for rearward movement, N range for neutral position and P range for parking. In the ranges of the forward movement, the manual valve 62 connects the main line 110 with a forward line 111 and with a rearward line 112 in the R range.

The first, second and third shift valves 63, 64 and 65 are formed with control ports 63a, 64a and 65a. To the ports 63a and 64a are connected first and second base pressure lines 113 and 114 separated from the forward line 111 respectively. To the control port 65a of the third shift valve 65 is connected a third base pressure line 115 separated from the main line 110. On the base pressure lines 113, 114 and 115 are disposed a first, second and third solenoid valves 66, 67 and 68 respectively. When the first and second solenoid valves 66 and 67 are ON, the valves 66 and 67 discharge the control pressures from the control ports 63a and 64a to move spools of the first and second shift valves 63 and 64 at left positions respectively. When OFF, the solenoid valves 66 and 67 move the spools of the valves 63 and 64 against a resilient force of a spring to the right positions. The third solenoid valve 68 discharge the control pressure of the control port 65a to move the spool of the valve 65 to a right position when it is ON. When OFF, the valve 68 introduce the control pressure to the port 65a from the third base

TABLE 1

| RANGE | | FORWARD CLUTCH (41) | COAST CLUTCH (42) | 3-4 CLUTCH (43) | REVERSE CLUTCH (44) | 2-4 BRAKE (45) | LOW REVERSE BRAKE (46) | ONEWAY CLUTCH FIRST (51) | ONEWAY CLUTCH SECOND (52) |
|---|---|---|---|---|---|---|---|---|---|
| P | | | | | | | | | |
| R | | | | | ○ | | ○ | | |
| N | | | | | | | | | |
| D | 1 | ○ | | | | | | ○ | ○ |
|   | 2 | ○ | | | | ○ | | ○ | |
|   | 3 | ○ | ○ | ○ | | | | ○ | |
|   | 4 | ○ | | ○ | | ○ | | | |
| S | 1 | ○ | | | | | | ○ | ○ |
|   | 2 | ○ | ○ | | | ○ | | ○ | |
|   | 3 | ○ | ○ | ○ | | | | ○ | |
| L | 1 | ○ | ○ | | | | ○ | ○ | ○ |
|   | 2 | ○ | ○ | | | ○ | | ○ | |

Figure 2:
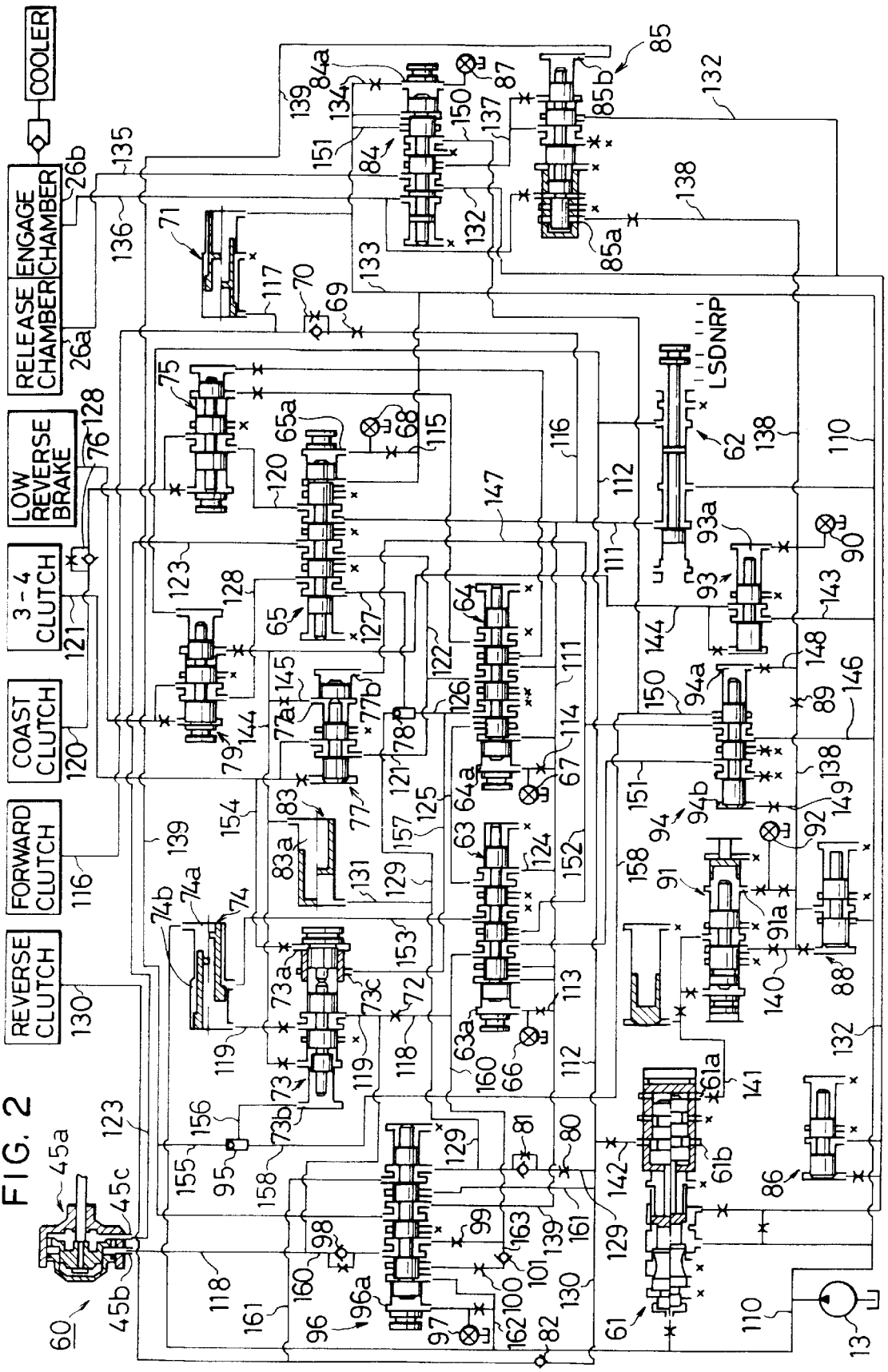
FIG. 2 shows a hydraulic control circuit incorporated into the automatic transmission of FIG. 1.

Next, a hydraulic pressure control circuit controlling actuators of the frictional elements 41–46 is explained hereinafter. The automatic transmission 10 is provided with a hydraulic control circuit 60 as shown in FIG. 2.

An actuator 45a of the 2-4 brake 45 of band brake includes a servo piston provided with an apply port 45b and release port 45c. When the hydraulic pressure is applied to only the apply port 45b, the actuator 45a engages the 2-4 brake 45. On the other hand, when no hydraulic pressure is applied to the ports 45b nor 45c or hydraulic pressure is applied both the ports 456b and 45c, the 2-4 brake is released. Actuators of the other frictional elements 41–44 pressure line 115 to move the spool against a resilient force of spring to a left position.

The solenoid valves 66–68 are ON, OFF controlled based on signals from a controller on a predetermined map set in accordance with a vehicle speed and a throttle opening of the engine. Consequently, the positions of the spools of the shift valves 63–65 are switched to thus switch hydraulic paths of the frictional elements 41–46 so that the elements 41–46 are engaged as shown in Table 1. Relationships between ON, OFF operations of the solenoid valves 66–68 and respective shift stages of the D, S and L ranges are shown in Table 2.

TABLE 2

| RANGE | D | | | | S | | | L | |
|---|---|---|---|---|---|---|---|---|---|
| SHIFT STAGE | 1 | 2 | 3 | 4 | 1 | 2 | 3 | 1 | 2 |
| FIRST SOLENOID VALVE (66) | OFF | ON | ON | ON | OFF | ON | ON | OFF | ON |
| SECOND SOLENOID VALVE (67) | ON | ON | OFF | OFF | ON | ON | OFF | ON | ON |
| THIRD SOLENOID VALVE (68) | ON | ON | OFF | ON | ON | OFF | OFF | OFF | OFF |

When the D, S or L are set by the manual valve, a line 116 is separated from the forward line 111 connected with the main line 110. The line 116 as a forward clutch line is connected to a forward clutch 41 through an orifice 69 and one way orifice 70. Thus, the forward clutch 41 is usually engaged in the D, S and L ranges. On the forward clutch line 116 is disposed N-D accumulator 71 downstream of the one way orifice 70 through line 117.

The forward line 111 is connected with the first shift valve 63 and is communicated with a servo apply line 118 and with the apply port 45b of the servo piston 45a when the first solenoid valve 66 is turned on so that the spool of the shift valve 63 is shifted to the left position. Thus, when the first solenoid valve 66 is ON in the D, S, L ranges, in other words, when the second, third and fourth shift stages in the D range, second and third shift stage in the S range and the second shift stage in the L range are established and where the hydraulic pressure (servo apply pressure) is introduced into the apply port 45b and a hydraulic pressure (servo release pressure) is not introduced into the release port 45c, the 2-4 brake is engaged. A 1-2 accumulator 74 is connected with the apply port 45b through a line 119 and an accumulation cut valve 73.

The forward line is also connected to the third shift valve 65 and is communicated with a coast clutch line 120 when the spool of the shift valve 65 is in the left position. The coast clutch line 120 is connected to the coast clutch 42 through a coast control valve 75 and one way orifice 76. Thus, when the third solenoid valve 68 is OFF in the D, S and L ranges, in other words, when the third shift stage in the D and S ranges, and the second shift stage in the S and L ranges, and the first shift stage in the L range are established, the coast clutch 42 is engaged.

Further, the forward line 111 is connected to the second shift valve 64 and is communicated with a 3-4 clutch line 121 when the second solenoid valve 67 is OFF and thus the spool of the second shift valve 64 is located at the right position. The line 121 is further connected to a 3-4 clutch 43 through a 3-4 control valve 77. Thus, when the second solenoid valve 67 is OFF in the D, S and L ranges, or when the third and fourth stages of D range and third shift stage of the S range are established, the 3-4 clutch is engaged.

A line 122 separated from the line 121 is connected to the shift valve 65 and is communicated with a servo release line 123 which is connected with the release port 45c of the servo piston 45a when the third solenoid valve 68 is OFF so that the spool of the shift valve 65 is in the left position. As a result, the servo release pressure is introduced to the release port 45c of the servo piston 45a so that the 2-4 brake 45 is released when the second and third solenoid valves 67 and 68 are OFF, in other words, when the third shift stages in the D and S ranges are established.

A line 124 separated from the forward line 111 is connected with the first shift valve 63. The line 124 is connected to a line 125 which is connected to the second shift valve 64 when the spool of the first shift valve 63 is in the right position. On the other hand, to the second shift valve 64 is connected a line 126 which is connected to the line 125 when the second solenoid valve 67 is ON to shift the spool of the second solenoid valve 67 at the left position. The line 126 is connected to the third shift valve 68 through a ball valve 78 and a line 127. The line 126 is connected to a low reverse brake line 128 which is connected to a low reverse brake 46 through a low reducing valve 79 when the third solenoid valve 68 is OFF to shift the spool of the third shift valve 65 at the left position. Thus, the low reverse brake 46 is engaged when the first, second and third solenoid valves 66–68 are OFF, ON and OFF respectively, or when the first shift stage of the L range is established.

A line 129 separated from the reverse line 112 which is connected to the main line 110 in the R range is connected to the third shift valve 65 through an orifice 80, one way orifice 81, the ball valve 78 and the line 127, and is communicated with the reverse brake line 128 when the third solenoid valve 68 is OFF to shift the spool of the valve 65 at the left position. The line 112 as a reverse clutch line 130 is also connected with the reverse clutch 44 through a one way valve 82 which interrupts a discharging flow of the hydraulic fluid. Thus, in the R range, the low reverse brake 46 is engaged when the third solenoid valve 68 is OFF. On the other hand, the reverse clutch is normally engaged in the R range. Meanwhile, N-R accumulator 83 is connected to a line 131 which is separated from the line 129 between the one way orifice and the ball valve 78.

The hydraulic control valve 60 is provided with a fourth shift valve 84 and lock-up control valve 85 for controlling the lock-up clutch 26 of the torque converter 20. To the fourth shift valve 84 and lock-up control valve 85 is connected a converter line 132 which is connected to the regulator valve 61 through the converter relief valve 86. To a control port 84a at one end of the fourth shift valve 84 is connected a base control pressure line 134 which is connected to the main line 110 through a line 133. The converter line 132 is brought into communication with a releasing line 135 which is connected with a releasing chamber 26a of the torque converter 20 to release the lock-up clutch 26 when a fourth solenoid valve 87 connected to the port 84a for making a lock-up control is OFF to shift the spool of the shift valve 84 at the left position. As a result, the lock-up clutch is released to establish the converter condition.

When the fourth solenoid valve 87 is turned ON to discharge the control pressure from the port 84a to thereby shift the spool of the valve 84 at the right position, the converter line 132 is brought into communication with an engaging line 136 which is connected to an engaging chamber 26b of the torque converter 20 so that the lock-up clutch is engaged. Concurrently, the line 135 is brought into communication with the lock-up control valve 85 through the shift valve 84 and an intermediate line 137 so that a hydraulic pressure adjusted in the control valve 85 is introduced to the releasing chamber 26a as a releasing pressure of lock-up condition.

To control port 85a at one end of the valve 85 is connected a base control pressure line 138 which is connected to the main line 110 through the solenoid reducing valve 88. To interrupt port 85b at the other end of the valve 85 is connected an interrupt line 139 which is connected to the forward line 111. Downstream of an orifice 89 disposed on the base control pressure line 138 is arranged a first duty solenoid valve 90 which adjusts a control pressure to the control port 85a so that a pressure difference between the engaging pressure to the engaging chamber 26a through the converter line 132 and engaging line 136 and the releasing pressure to the releasing chamber 26b through the intermediate line and the releasing line 135 is adjusted to accomplish a desired slip condition of the lock-up clutch 26 provided that the line pressure is not introduced to the interrupt port 85b through the interrupt line 139.

When the line pressure is supplied to the interrupt port 85b of the valve 85 through the line 139, the spool of the control valve 85 is fixed at the left position. In this case, the hydraulic pressure of the lock-up releasing chamber 26a is discharged from the drain port of the control valve 85 through the releasing line 135, fourth shift valve 84 and intermediate line 137 so that a lock-up condition in which the lock-up clutch 26 is fully engaged is established. In the drain port, there is provided an orifice of a predetermined diameter which prevents the hydraulic fluid from excessively flowing out therethrough even if the hydraulic fluid introduced to the engaging chamber 26b through the engaging line 136 is introduced to the releasing chamber 26a.

The first duty solenoid valve 90 operates as follows. As a duty ratio D is increased, a duty control pressure of the first duty solenoid valve 90 is decreased. Therefore, when the duty ratio D is 100%, the drain port of the valve 90 is fully opened so that the pressure level of the base pressure control line 132 is zero downstream of the orifice 89. On the other hand, when the duty ratio D is zero, the drain port is interrupted to maximize the pressure level of the valve 90.

The hydraulic control circuit 60 is provided with a throttle modulator valve 91 and a second duty solenoid valve 92 for controlling a line pressure which is adjusted by the regulator valve 61.

To the throttle modulator valve 91 is connected a line 140 which is connected to the main line 110 through the solenoid reducing valve 88. To a control port 91a at one end is introduced a duty control pressure adjusted by a second duty solenoid valve 92 which is periodically opened and closed to produce a throttle modulator pressure in accordance with a duty ratio D of the valve 92. In this case, the duty ratio D is determined in accordance with, for example, a throttle opening so that the throttle modulator pressure corresponding to the duty ratio D is introduced to a first apply port 61 of the regulator valve 61 through a line 141 to increase the line pressure which is adjusted by the regulator valve 61 in accordance with the throttle valve and the like.

In the illustrated embodiment, the duty control pressure produced by the first duty solenoid valve 90 is also introduced into a control port 93a of a modulator valve 93. The modulator valve adjusts the line pressure introduced from the main line 110 through a line 143 in accordance with the duty control pressure from the first duty solenoid valve 90 to produce a modulator pressure and to introduce the modulator pressure to a back pressure chamber 83a of the N-R accumulator 83 and the like through a line 144.

To a control port 77a of the 3-4 control valve 77 disposed on the 3-4 clutch line is connected a line 145 which is separated from the line 144. Therefore, when the first duty solenoid valve 90 is subjected to a duty control, a modulator pressure is produced in accordance with the duty ratio D and introduced to the port 77a so that a hydraulic pressure (3-4 clutch pressure) which is controlled by the control valve 77 is also controlled to a value corresponding to the duty ratio D.

The 3-4 control valve 77 is provided with an interrupt port 77b at one end for preventing the valve 77 from making a pressure adjusting action (pressure reducing action).

To the interrupt port 77b is connected an interrupt line 146 which is connected to the main line 110 through a switching valve 94 and a line 146. When the line 147 is communicated with the line 146 through the switching valve 94, the line pressure is introduced to the interrupt port 77b of the 3-4 control valve from the main line 110 to prevent the control valve 77 from making the pressure adjusting action.

To a control port 94a at one end of the valve 94 is connected a line 148 separated from the base pressure control line 138 between the orifice and the first duty solenoid valve 90. To a balance port 94b at the other end of the valve 94 is connected a line 149 separated from the line 138 upstream of the orifice 89. When the duty control pressure is greater than a predetermined value, the spool of the valve 94 is shifted to the left position so that the interrupt line 147 is brought into the line 146 to introduce the line pressure of the main line 110 to the interrupt port 77b of the valve 77 through the line 146 to prevent the valve 77 from making the pressure adjusting action. When the duty control pressure produced by the first duty solenoid 90 is reduced below the predetermined value, the spool is moved toward the right position against the resilient force of the spring to separate the interrupt line 147 from the line 146.

To the switching valve 94 is connected a line 150 which is brought into communication with the line 147 when the spool is in the right position. The line 150 is connected to the fourth shift valve 84 and is brought into communication with a line 151 which is connected to the main line 110 through the line 133 when the spool of the shift valve 84 is in the right position. In other words, when the fourth solenoid valve 87 is turned ON to enable a control of the engaging force of the lock-up clutch 26, the line pressure from the main line 110 is introduced to the interrupt line 147 through the lines 133, 151, fourth shift valve 84 and line 150. In the converter condition in which the spool of the valve 84 is in the left position, the line 150 is connected to a drain port of the shift valve 84.

To the switching valve 94 is connected a drain line 152 which is brought into communication with the servo apply line 118 when the spool of the first shift valve 63 is in the right position. The drain line 152 is selectively connected to two drain ports with different flow reduction rates. In the illustrated embodiment, the right hand drain port is smaller than the left hand drain port (in FIGS. 2 and 4).

To the first shift valve 63 is connected a line 153 separated from the interrupt line 147. When the first solenoid valve 66 is turned ON to shift the spool of the shift valve 63 to the left position, the line 153 is brought into communication with the line 154 which is connected to a second back pressure port 74b of the 1-2 accumulator 74 to which the line pressure from the main line 110 is introduced at a first back pressure chamber 74a. Therefore, when the line pressure is introduced to the line 147 and when the spool of the shift valve 63 is in the left position, the line pressure is introduced to the second back pressure chamber 74b of the 1-2 accumulator 74 through the line 152 and the line 153.

To a control port 73a at one end of the accumulation cut valve 73 disposed on the line 119 which is separated from the servo apply line 118 and is connected to the 1-2 accumulator 74 is connected a line 155 separated from the 3-4 clutch line 121 downstream of the 3-4 control valve 77. To an accumulation cut interrupt port 73b at the other end of the valve 73 is connected a line 157 which is connected to the interrupt line 139 for preventing the lock-up control valve 85 from making the pressure adjusting action through a ball valve 95 and line 156. To an intermediate port 73c provided at an intermediate portion of the accumulation cut valve 73 is connected a line 158 separated from the line 126 which is connected to the second shift valve 64. To the ball valve 95 connected to the line 157 which is communicated with the accumulation cut port 73b of the valve 73 is connected a line 158 separated from a line 150 connecting the switching valve 94 with the fourth shift valve 84.

In addition, the hydraulic control circuit 60 is provided with a fifth shift valve 96 for controlling a shift timing. To the shift valve 96 are connected a bypass line 160 bypassing the orifice on the servo apply line 118, a second bypass line 161 bypassing the one way valve 82 on the reverse clutch line 130, and the interrupt line 139 connected to the interrupt port 85b of the valve 85. To a control port 96a at one end of the shift valve 96 is connected a base pressure control line 162 separated from the main line 110. When the fifth solenoid valve 97 is switched ON and OFF to shift the positions of the spool of the shift valve 96, the first, second bypass lines 160 and 161 and the interrupt line 139 are opened and closed.

That is, when the fifth solenoid valve 97 is OFF to place the spool of the shift valve 96 at the right position, the first bypass line 160 and interrupt line 139 are opened whereas the second bypass line 161 is interrupted. In this case, a downstream portion of the second bypass line 161 is connected with the line 129 on which the orifice 80 and one way orifice 81 are disposed. Then, the line 161 is connected to the reverse clutch line 130 or the reverse line 112 through the line 129. On the other hand, when the fifth solenoid 97 is turned ON to move the spool of the shift valve 96 to the left position, the first bypass line 160 and the interrupt line 139 are interrupted whereas the second bypass line 160 is opened.

On the first bypass line 160 is disposed a one way orifice 98 downstream of the fifth valve 96 for reducing a supply flow of the hydraulic fluid to the valve 96 and a normal type of orifice 99 upstream of the fifth shift valve 96. On a line 163 separated from the first bypass line 160 upstream of the orifice 99 is disposed another orifice 100 smaller than the orifice 99 and a one way valve 101 for preventing a supply flow of the hydraulic fluid to the valve 96. The line 163 is connected to the first bypass line 160 downstream of the valve 96 when the spool of the fifth shift valve 96 is positioned at the left position.

Figure 3:
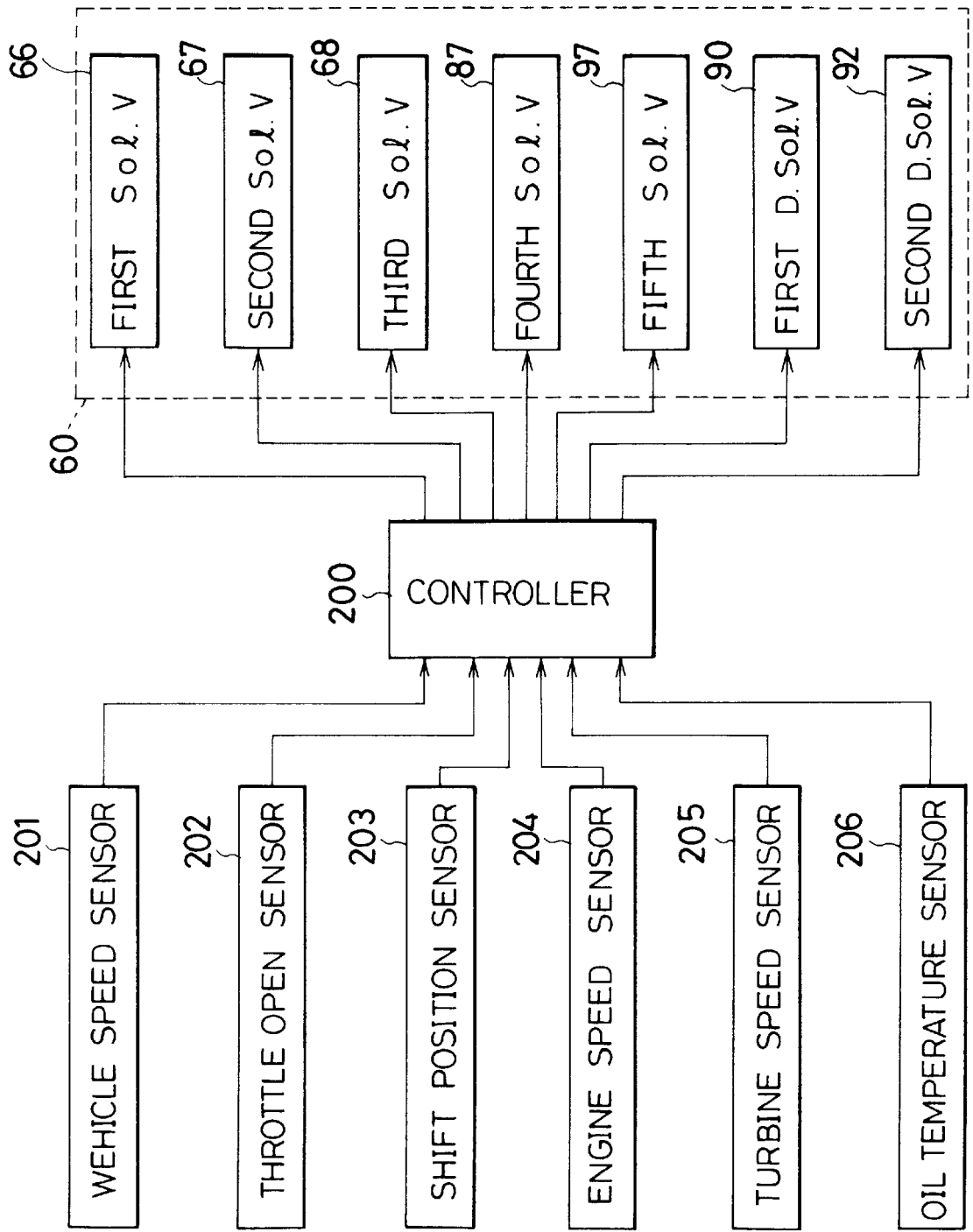
FIG. 3 is a block chart of a control system for the automatic transmission.

As shown in FIG. 3, the automatic transmission 10 is provided with a controller 200 for controlling the first to third solenoid valves 66–68 for shift operation, the fourth solenoid valve 87, first duty solenoid valve 90, fifth solenoid valve 97 and second duty solenoid valve 92. The controller 200 receives signals from a vehicle speed sensor 201, throttle opening sensor 202, shift position sensor 203 for detecting a position of shift lever, engine speed sensor 204 for detecting engine speed, turbine speed sensor 205 for detecting a turbine rotation speed, hydraulic temperature sensor 206 for detecting the temperature of the hydraulic fluid and controls the solenoid valves in accordance with the operating condition or driver's requirement.

With this structure of the automatic transmission 10, for example, in a shift operation where the 3-4 clutch 43 is involved, the 3-4 clutch 43 is controlled by the 3-4 control valve 77 as follows.

Figure 4:
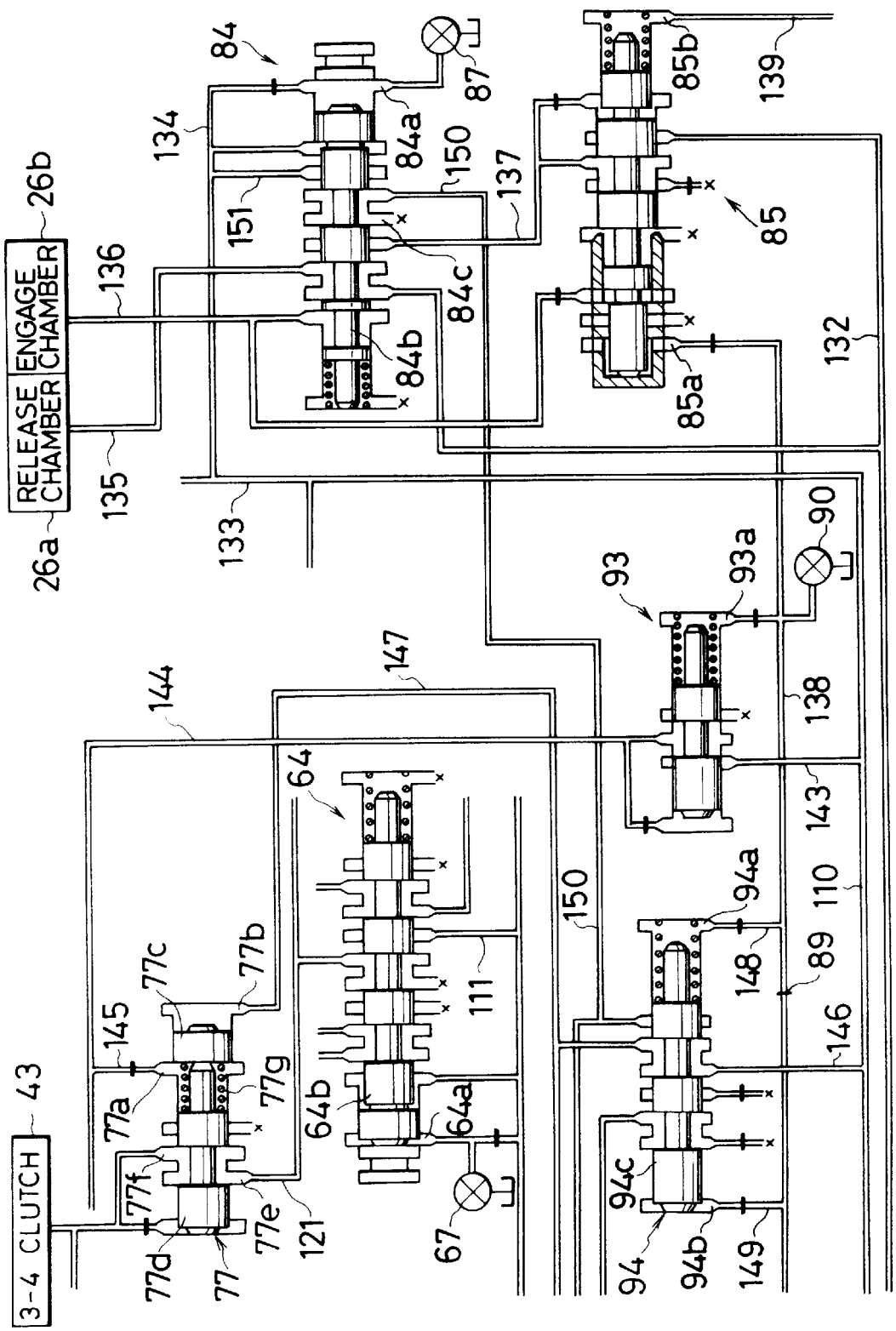
FIG. 4 is an enlarged view of the hydraulic control circuit showing a condition during the 2-3 shift operation.

Assuming that the lock-up clutch 26 is in the converter condition in the second stage, the fourth solenoid valve 87 which controls the fourth shift valve 84 is turned OFF to position the spool 84a of the shift valve 84 at a left position as shown in FIG. 4. In this position, the line 150 connected to the shift valve 84 through the switching valve 94 is communicated with the drain port 84c of the shift valve 84.

In this case, if the first duty solenoid valve 90 is not actuated, the pressure level of the control line 138 is kept at the maximum value so that a hydraulic force from the control port 94a is added to the spring force acting on the spool 94c of the switching valve 94 rightward in the drawing. As a result, the spool 94c is kept at the left position against the hydraulic force from the left side. In this condition, the interrupt line 147 communicated to the interrupt port 77b of the 3-4 control valve 77 is communicated with the line 146 which is communicated with the main line 110. Thus, the line pressure of the main line 110 is introduced to the interrupt port 77b through the lines 146 and 147. A plug 77c in the 3-4 control valve 77 is urged toward left by virtue of the line pressure so that the spool 77d is also urged toward left by the plug 77c and positioned at the left side. As a result, the input port 77e of the 3-4 control valve 77 is fully communicated with the output port 77f.

With this condition, assuming that the driving condition is changed to produce a 2-3 shift command which is intended to change the shift stage from second to third, the second solenoid valve 67 which controls the second shift valve 64 is turned OFF so that the spool 64b of the second shift valve 64 is moved leftward. In this case, the controller 200 produces a duty control signal to the first duty solenoid valve 90 so as to provide a duty control pressure of the valve 90 with a value smaller than a predetermined value $P_0$. As a result, the hydraulic pressure introduced from the balance port 94b of the switching valve 94 becomes greater than that from the control port 94b so that the spool 94c of the switching valve 94 is moved rightward against the spring force from the right side thereof.

Figure 5:
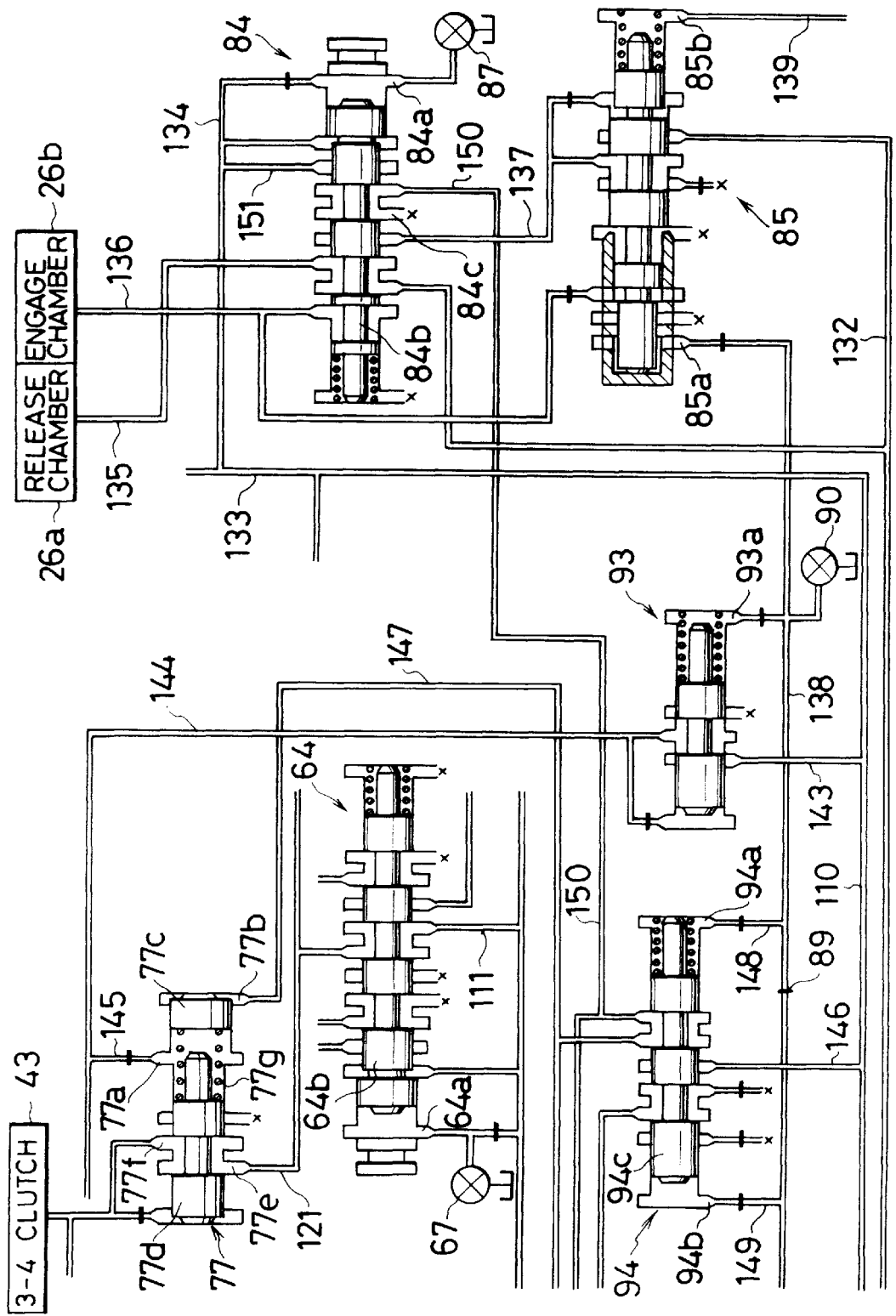
FIG. 5 is a similar view to FIG. 4 showing the 2-3 shift operation.

Consequently, as shown in FIG. 5, the interrupt line 147 communicated with the interrupt port 77b of the 3-4 control valve 43 is separated from the line 110 communicated with the main line 110 and brought into communication with the line 150 communicated with the fourth shift valve 84. As a result, the line pressure which was introduced to the interrupt port 77b of the valve 43 is discharged from the drain port 84c of the fourth shift valve 84. Accordingly, the plug 77d of the 3-4 control valve 43 is moved rightward by virtue of the spring 77g disposed between the spool 77d and plug 77c allowing the 3-4 control valve 77 to make a pressure adjusting (reducing) action. If the first solenoid valve 90 is controlled based on a predetermined duty ratio D, a modulator pressure is produced in the modulator valve 93 for the accumulator in accordance with the duty ratio D. The modulator pressure is introduced to the control port 77a of the control valve 43. The line pressure introduced to the input port 77e of the valve 77 is adjusted corresponding to the modulator pressure and supplied to the 3-4 clutch valve 43 as a 3-4 clutch pressure. In this case, preferably, the first duty solenoid valve 90 is controlled in accordance with the duty ratio which is changed in a manner that the 3-4 clutch pressure has a leveled pressure condition while changing. This control enables the 3-4 clutch to be brought into full engagement in a short time without producing a torque shock.

When the 3-4 clutch 43 is fully engaged following the entire release of the 2-4 brake 45 and thus the shift operation to the third stage is completed, the duty control signal provides the duty solenoid valve 90 with a duty control pressure greater than a value $P_0$. As a result, the spool 94c of the switching valve 94 which is positioned at the right side is moved leftward. Thus, the line pressure from the main line 110 is supplied to the interrupt port 77b of the 3-4 control valve 77 through the line 146 and the interrupt line 147 so that the plug 77c of the valve 77 is moved leftward and the spool 77d is kept at a position where the input port 77e is brought into full engagement with the output port 77f. As a result, the line pressure from the forward line 111 which is introduced to the control valve 77 from the second shift valve 64 through the 3-4 clutch line 121 is introduced to the 3-4 clutch 43 without reducing the pressure level and thus the clutch 43 is surely engaged.

Figure 6:
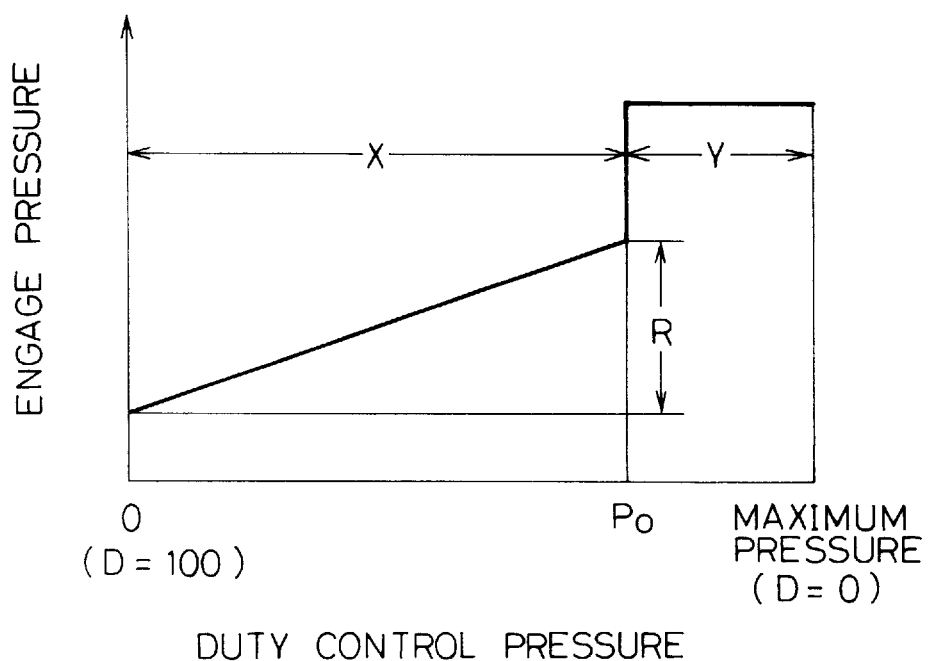
FIG. 6 is a time chart showing a relationship between a 3-4 clutch pressure and a duty control pressure of the first duty solenoid valve.

As aforementioned, the switching valve 94 disposed between the interrupt line 147 communicated with the interrupt port 77b of the 3-4 control valve 77 and the line 146 communicated with the main line 110 is so actuated that the interrupt line 147 is brought into communication with the line 146 when the duty control pressure due to the first duty solenoid valve 90 is greater than the value $P_0$. As a result, the engaging pressure of the 3-4 clutch 43 is changed versus the duty control pressure controlled by the first duty solenoid valve 90 in accordance with a characteristic as shown in FIG. 6. That is, the engaging pressure is variably controlled in a range X where the control pressure is smaller than a value $P_0$ and kept at the maximum value which is the same value as the line pressure in a range Y where the control pressure is greater than the value $P_0$. Accordingly, a control range R can be reduced in the range X so that the engaging pressure can be precisely controlled during the shift operation in accordance with the driving condition.

Figure 7:
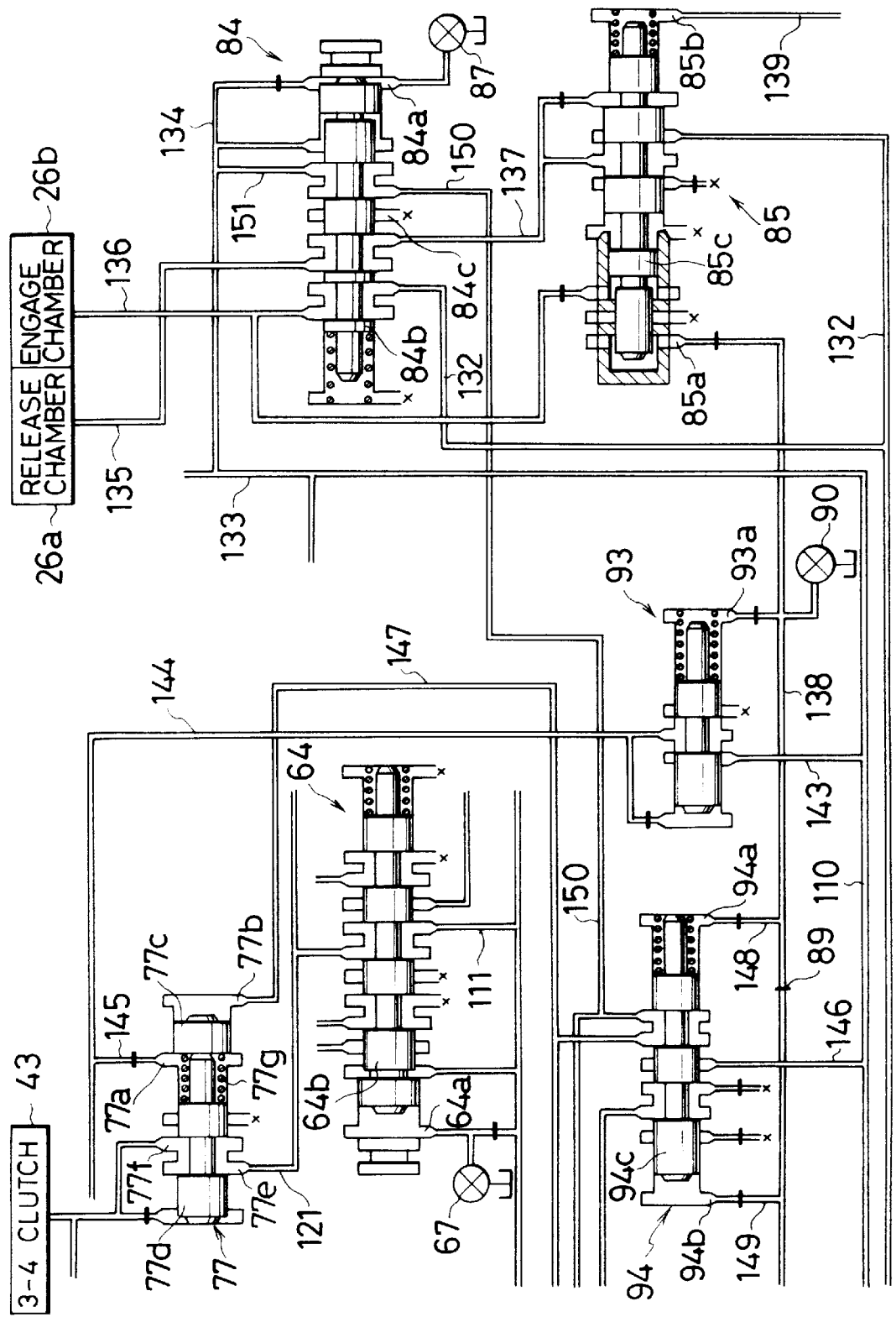
FIG. 7 is an enlarged view of the hydraulic control circuit showing a condition during the slip control condition of the lock-up clutch.

If the converter condition is switched to the slip condition in the control of the lock-up control in the case where the 3-4 clutch 43 is engaged, the fourth and fifth solenoid valves 87 and 97 are turned ON. As a result, the spools of the shift valves 84 and 85 in the hydraulic circuit 60 of FIG. 2 are moved rightward and leftward respectively. Thus, the converter line 132 communicated with the fourth shift valve 84 is communicated with the engaging line 136 communicated with the engaging chamber 26b of the lock-up clutch 26 as shown in FIG. 7. Concurrently, the intermediate line 137 communicated with the lock-up control valve 85 is brought into communication with the releasing line 135 which communicates with the releasing chamber 26a of the lock-up clutch 26. The interrupt line 139 which supplies the line pressure of the forward line 111 to the interrupt port 85b of the lock-up converter 85 is interrupted by the fifth shift valve 96 so that the hydraulic fluid downstream of the valve 96 is exhausted from the drain port. Thus, the control pressure introduced to the control port 85a which is positioned opposite to the interrupt port 85b with regard to the spool 85c is controlled by the first duty solenoid valve 90 so that the hydraulic pressure in the converter line 132 communicated with lock-up control valve 85 is introduced to the intermediate line 137 after the pressure is adjusted corresponding to the duty control pressure. The output pressure of the converter line 132 is introduced to the releasing chamber 26a of the lock-up clutch 26 through the intermediate line 137, fourth shift valve 84 and releasing line 135 as a releasing pressure. On the other hand, to the engaging chamber 26b of the lock-up clutch 26 is directly introduced the hydraulic pressure of the converter line 132 which is introduced to the fourth shift valve 84 through the engaging line 136 as an engaging pressure. Thus, the lock-up clutch 26 is subjected to the slip control in accordance with the pressure difference between the engaging and releasing pressures.

In this case, the spool 84b of the fourth shift valve 84 is positioned at the right side so that the line 151 communicated with the line 110 through the line 133 is brought into communication with the line 150 which is communicated with the switching valve 94. Accordingly, even where the duty control pressure of the first duty solenoid valve 90 is reduced below the predetermined pressure $P_0$ due to the slip control so that the spool 94c of the switching valve 94 is positioned at the right side, the line pressure of the main line 110 introduced to the line 151 is introduced to the interrupt port 77c of the 3-4 control valve 77 through the line 150, switching valve 94 and interrupt line 147 so as to prevent a pressure reducing action due to the movement of the spool 77d. Thus, the 3-4 clutch 43 can be kept engaged without failure.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A control system of an automatic transmission comprising:

a torque converter, a lock-up clutch for directly connecting an input member and an output member of the torque converter, a pressure control valve which changes a hydraulic pressure to modify an engaging force of the lock-up clutch and an engaging force of a frictional element, a pressure regulator, disposed on an engaging passage which supplies a hydraulic pressure to engage said frictional element, for adjusting a primary pressure and producing an output hydraulic pressure corresponding to a control pressure introduced into a control port of the pressure regulator, and a control pressure supply device for introducing the control pressure, which is controlled by the pressure control valve, into the control port of the pressure regulator.

2. A control system as recited in claim 1 wherein the pressure control valve is a duty solenoid valve which produces a hydraulic pressure which is continuously changed in accordance with a duty control signal introduced thereto.

3. A control system as recited in claim 2 wherein the pressure regulator comprises:

an input port provided on a valve body for receiving a hydraulic pressure for engaging the frictional element, an output port provided on the valve body for introducing a hydraulic pressure to the frictional element, a spool disposed in the valve body, and a plug juxtaposed to the spool in the valve body, the control pressure being introduced into the valve body through the control port which is positioned between the spool and the plug so as to control communication between the input port and output port and thus control the output hydraulic pressure.

4. A control system as recited in claim 3 and further comprising a spring disposed between the spool and plug.

5. A control system as recited in claim 3 wherein the spool is positioned to allow the input port to be changeably communicated with the output port when the control pressure is not greater than a predetermined value.

6. A control system as recited in claim 1 and further comprising;

a switching valve to which the control pressure controlled by the pressure control valve is introduced:

the switching valve being actuated to introduce an interrupt pressure to an interrupt port of the pressure regulator so as to prevent the pressure regulator from controlling the output hydraulic pressure when the control pressure introduced to the control port is greater than a predetermined value.

7. A control system as recited in claim 6 wherein the pressure regulator comprises:

an input port provided on a valve body for receiving a hydraulic pressure for engaging the frictional element, an output port provided on the valve body for introducing a hydraulic pressure to the frictional element, a spool disposed in the valve body, and a plug juxtaposed to the spool in the valve body, the control pressure being introduced into the valve body through the control port which is positioned between the spool and the plug so as to control communication between the input port and output port and thus control the output hydraulic pressure.

8. A control system as recited in claim 7 wherein the interrupt pressure and the control pressure act on the plug in opposite directions.

9. A control system as recited in claim 7 and further comprising a spring disposed between the spool and plug.

10. A control system as recited in claim 7 wherein the spool is positioned to allow the input port to be changeably communicated with the output port when the control pressure is not greater than the predetermined value.

11. A control system as recited in claim 6 and further comprising an interrupt device for preventing the pressure regulator from controlling the output hydraulic pressure in a slip condition of the lock-up clutch in which the engaging force of the lock-up clutch is controlled in accordance with a vehicle driving condition.

12. A control system as recited in claim 1 and further comprising an interrupt device for preventing the pressure regulator from controlling the output hydraulic pressure in a slip condition of the lock-up clutch in which the engaging force of the lock-up clutch is controlled in accordance with a vehicle driving condition.

13. A control system as recited in claim 1 wherein the pressure regulator comprises:

an input port provided on a valve body for receiving a hydraulic pressure for engaging the frictional element, an output port provided on the valve body for introducing a hydraulic pressure to the frictional element, a spool disposed in the valve body, and a plug juxtaposed to the spool in the valve body, the control pressure being introduced into the valve body through the control port which is positioned between the spool and the plug so as to control communication between the input port and output port and thus control the output hydraulic pressure.

14. A control system as recited in claim 1 and further comprising a spring disposed between the spool and plug.

15. A control system as recited in claim 13 wherein the spool is positioned to allow the input port to be changeably communicated with the output port when the control pressure is not greater than a predetermined value.

16. A control system of an automatic transmission comprising:

a torque converter, a lock-up clutch for directly connecting an input member and an output member of the torque converter, a frictional element for establishing one of a plurality of shifting stages of the automatic transmission, a pressure control valve for adjusting a primary pressure and producing a hydraulic pressure to control an engaging force of the lock-up clutch and an engaging force of the frictional element, and an interrupt device for preventing the hydraulic pressure from controlling the engaging force of the frictional element in a slip condition of the lock-up clutch in which the engaging force of the lock-up clutch is controlled in accordance with a vehicle driving condition.

17. A control system of an automatic transmission as defined in claim 16, wherein said interrupt device is actuated to supply hydraulic pressure directly to the frictional element in the slip condition of the lock-up clutch.

18. A control system of an automatic transmission comprising:

a torque converter, a lock-up clutch for directly connecting an input member and an output member of the torque converter, a frictional element for establishing one of a plurality of shifting stages of the automatic transmission, a pressure control valve for adjusting a primary pressure and producing a hydraulic pressure to control an engaging force of the lock-up clutch and an engaging force of the frictional element, and an interrupt device for preventing the hydraulic pressure from controlling the engaging force of the lock-up clutch in a shift condition while the engaging force of the frictional element is controlled by the hydraulic pressure.

19. A control system as recited in claim 11, wherein the pressure regulator comprises a valve body and a plug in the valve body, and the interrupt device comprises a valve for controlling the lock-up clutch between a torque converting condition and the slip condition and introducing the primary pressure into a chamber defined by the valve body and the plug of the pressure regulator so as to fully communicate an input port and an output port of the valve body in the slip condition.

20. A control system as recited in claim 12, wherein the interrupt device comprises a valve for controlling the lock-up clutch between a torque converting condition and the slip condition and introducing the primary pressure into the pressure regulator in the slip condition.

* * * * *